Jan. 15, 1929.

G. A. SCHUMACHER ET AL 1,699,026

ORTHOPEDIC OR FRACTURE BED FRAME

Filed Aug. 17, 1927　　2 Sheets-Sheet 2

INVENTOR
GEORGE A. SCHUMACHER
HAROLD W. SCHUMACHER

BY Chappel Carl
ATTORNEY

Patented Jan. 15, 1929.

1,699,026

UNITED STATES PATENT OFFICE.

GEORGE A. SCHUMACHER AND HAROLD W. SCHUMACHER, OF ALBION, MICHIGAN.

ORTHOPEDIC OR FRACTURE BED FRAME.

Application filed August 17, 1927. Serial No. 213,546.

The objects of this invention are,

First, to provide an orthopedic or fracture frame which can be readily used on any bed and still provide for complete adjustments and supports as they may be needed.

Second, to provide an improved frame structure.

Third, to provide improved adjustable means and clamps for such structure.

Objects which pertain to details of construction will appear from the detailed description to follow. The invention is defined in the claims.

A structure which is a preferred embodiment of the invention is illustrated in the accompanying drawing, in which:

Fig. 4 is an enlarged detail elevation view of one of the main adjustable clamps.

Fig. 5 is a detail sectional elevation of the clamp appearing in Fig. 4, taken on line 5—5 of Fig. 4.

Fig. 6 is a detail view of a single clamp member usable in the same relation as the other.

Figure 1:
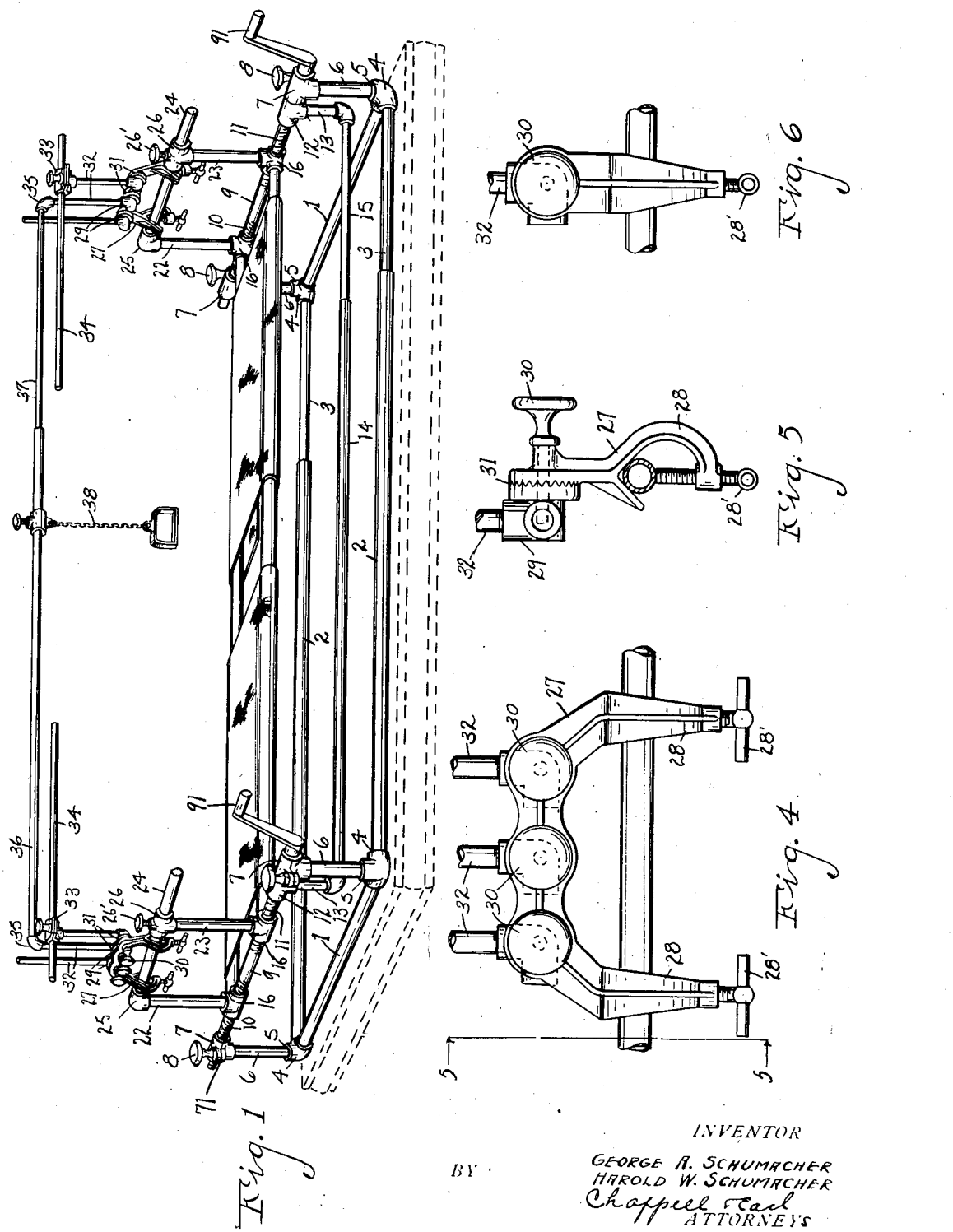
Fig. 1 is a detail perspective view of the entire structure, the bed mattress on which the main frame rests being indicated by dotted lines.
Figure 2:
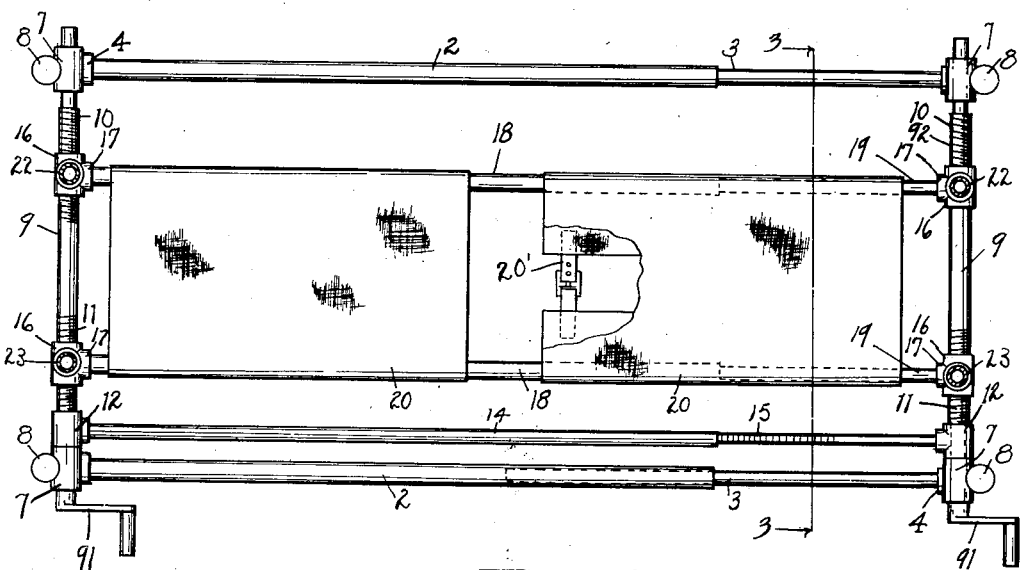
Fig. 2 is a detail sectional plan view of the structure taken on the plane of line 2—2 of Fig. 3.
Figure 3:
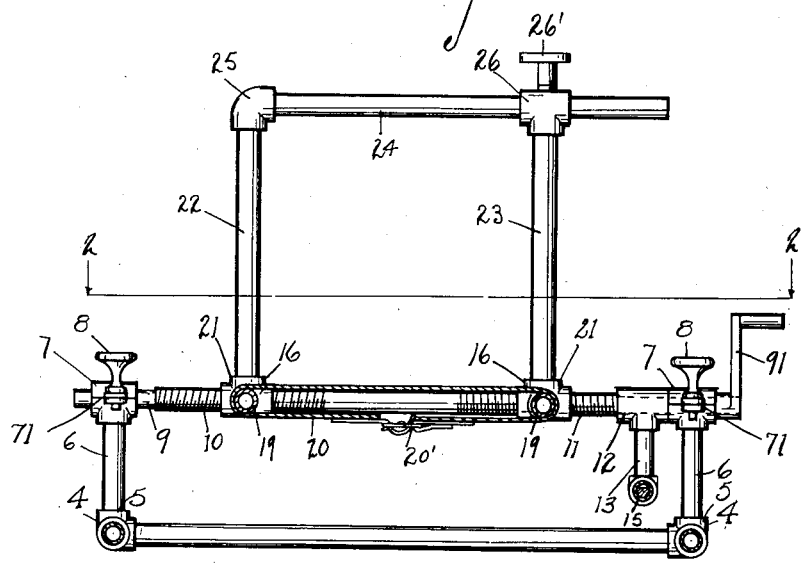
Fig. 3 is an enlarged sectional elevation taken on the plane of line 3—3 of Fig. 2, the clamps and adjustable supports being omitted.

The parts of the drawings will be identified by numerals of reference which are the same in all the views.

The main base frame which is disposed upon the mattress is made up of end bars 1, 1, connected by telescopic side bars 2, 3. The corners are three-way pipe fittings 4 comprising an elbow for the corner and an upright socket 5 for the corner post 6. The end bar 1 and the outer telescopic bars 3, 3 are inserted in the elbows at one end, and the end bar 1 and inner telescopic side bars 2, 2 are inserted in the elbows at the other end. The third way of each coupling points upwardly and forms a socket 5 at each corner for the corner post 6. On the top of each post 6 is a T joint 7, the cross part of which is open at one side to form a clamp 71 which is controlled by the hand screw 8. At each end of the frame is journalled the right and left hand screw 9 disposed in the clamp 71, having one screw thread 10 at one end and an opposite screw thread 11 at the opposite end. Each screw 9 is controlled by a crank 91 and constitutes one end of an auxiliary bed above the supporting bed.

At one end of each screw is a T bracket 12 having a hanger section 13 which suspends by an elbow at each end a telescopic ratchet rod made up of the members 14, 15. Four-way bracket fixtures 16, 16 are carried at opposite ends of the right and left hand screw 9, and are adjustable to and from each other by screw 92. These have horizontal sockets 17, 17 receiving the telescopically sectional rods 18, 19 which serve as the bed side rails. The suspending bed comprises a plurality of canvas sections 20 secured thereto by buckled straps 20', presenting a smooth surface above and capable of separation to form space for the convenience of the patient supported thereon. The canvas bed sections can of course be very readily tensioned by the right and left hand screws 9 at each end and when tensioned the screw can be held by the hand set screws 8.

Upright sockets 21, 21 formed on the couplings 16 carry uprights 22, 23 respectively at each end. A cross bar 24 is secured by elbow 25 to the upper end of the upright 22 and is adjustable and telescopes through the T clamp 26 on the upper end of the upright 23 and is held by set screw 26' thus constituting a telescoping supporting bar. Carried on the bar 24 are adjustable clamp members comprising preferably a body 27 secured thereto, preferably by C-shaped clamps 28 provided with the usual set screws 28'. Adjustable brackets 29 are provided, suitably serrated at 31 and controlled by hand set screws 30. Projecting arms 32 are in sockets on the brackets 29 and clamp the brackets 33 which carry supporting arms 34 which extend out over the bed for any purpose required. The vertical arms 32 may be provided with elbows 35, 35 and telescopic bar members 36, 37 for supporting slings 38 or any appliance which may be needed for use in this behalf.

The structure is capable of very considerable variation without departing from our invention. While the structures we have shown are especially available for support on an ordinary bed and can simply be placed on the bed mattress, the structure is capable of being organized independently of a bed by suitable means which will be readily understood. We desire to claim the invention specifically and broadly, as pointed out in the appended claims.

Having thus described our invention, what we claim as new and desire to secure by Letters Patent is:

1. An orthopedic or fracture bed frame structure comprising a base frame provided with end bars with elbow corner brackets and telescopic side bars for adjusting the length thereof, upright sockets on said corner brackets, upright corner posts in the corner sockets, an auxiliary bed having transverse bed end bars comprising right and left hand screws, adjustable clamp means at the top of said posts for said auxiliary bed end bars, a hanger on each end bar, a telescopic ratchet bar supported thereby, adjustable slide brackets carried by said screws for the auxiliary bed, horizontal sockets in said slide brackets, telescopic side rails for said auxiliary bed carried by the horizontal sockets of said slide brackets, sections of canvas bed support on said side rails, upright sockets on said slide brackets, posts in said sockets at head and foot of said auxiliary bed, horizontal transverse telescopic support bars disposed above the auxiliary bed ends carried by said upright posts to permit adjustment of same, clamps secured to said horizontal bar, adjustable arms carried by said clamps on said end support with lateral arms projecting therefrom, and a longitudinal telescoping side bar carried by said end structure, for the purpose specified.

2. An orthopedic or fracture bed frame structure comprising a base frame provided with end bars with elbow corner brackets and telescopic side bars for adjusting the length thereof, upright sockets on said corner brackets, upright corner posts in the corner sockets, an auxiliary bed having transverse bed end bars comprising right and left hand screws, adjustable clamp means at the top of said posts for said auxiliary bed end bars, a hanger on each end bar, a telescopic ratchet bar supported thereby, adjustable slide brackets carried by said screws for the auxiliary bed, horizontal sockets in said slide brackets, telescopic side rails for said auxiliary bed carried by the horizontal sockets of said slide brackets, sections of canvas bed support on said side rails, upright sockets on said slide brackets, posts in said sockets at head and foot of said auxiliary bed, horizontal transverse telescopic support bars disposed above the auxiliary bed ends carried by said upright posts to permit adjustment of same, clamps secured to said horizontal bar, and adjustable arms carried by said clamps on said end support with lateral arms projecting therefrom, for the purpose specified.

3. An orthopedic or fracture bed frame structure comprising a base frame provided with end bars with elbow corner brackets and telescopic side bars for adjusting the length thereof, upright sockets on said corner brackets, upright corner posts in the corner sockets, an auxiliary bed having transverse bed end bars comprising right and left hand screws, adjustable clamp means at the top of said posts for said auxiliary bed end bars, adjustable slide brackets carried by said screws for the auxiliary bed, horizontal sockets in said slide brackets, telescopic side rails for said auxiliary bed carried by the horizontal sockets of said slide brackets, sections of canvas bed support on said side rails, upright sockets on said slide brackets, posts in said sockets at head and foot of said auxiliary bed, horizontal transverse telescopic support bars disposed above the auxiliary bed ends carried by said upright posts to permit adjustment of same, clamps secured to said horizontal bar, and adjustable arms carried by said clamps on said end support with lateral arms projecting therefrom, for the purpose specified.

4. An orthopedic or fracture bed frame structure comprising a base frame provided with end bars with elbow corner brackets and telescopic side bars for adjusting the length thereof, upright sockets on said corner brackets, upright corner posts in the corner sockets, transverse bed end bars comprising right and left hand screws, adjustable clamp means at the top of said posts for said bed end bars, an auxiliary bed structure, posts at head and foot of said bed, supports above carried by said upright posts, a horizontal bar in said support, clamps secured to said horizontal bar, and adjustable arms on said clamp with lateral arms projecting therefrom, for the purpose specified.

5. An orthopedic or fracture bed frame structure comprising a base frame provided with end bars with elbow corner brackets and telescopic side bars for adjusting the length thereof, upright sockets on said corner brackets, upright corner posts in the corner sockets, transverse bed end bars comprising right and left hand screws, adjustable clamp means at the top of said posts for said bed end bars, a hanger on each end bar, and a telescopic ratchet bar supported thereby, as specified.

6. An orthopedic or fracture bed frame structure comprising a base frame provided with end bars with elbow corner brackets and telescopic side bars for adjusting the length thereof, upright sockets on said corner brackets, upright corner posts in the corner sockets, transverse bed end bars comprising right and left hand screws, and adjustable clamp means at the top of said posts for said bed end bars, as specified.

In witness whereof we have hereunto set our hands.

GEORGE A. SCHUMACHER.
HAROLD W. SCHUMACHER.